United States Patent
Rohlfs

(10) Patent No.: US 10,510,115 B2
(45) Date of Patent: *Dec. 17, 2019

(54) COMPUTERIZED EXCHANGE CONTROLLED NETWORK SYSTEM AND RELATED METHOD

(71) Applicant: DEARBORN FINANCIAL, INC., St. Charles, IL (US)

(72) Inventor: Michael B. Rohlfs, Northbrook, IL (US)

(73) Assignee: DEARBORN FINANCIAL, INC., St. Charles, IL (US)

( * ) Notice: Subject to any disclaimer, the term of this patent is extended or adjusted under 35 U.S.C. 154(b) by 474 days.

This patent is subject to a terminal disclaimer.

(21) Appl. No.: 15/347,498

(22) Filed: Nov. 9, 2016

(65) Prior Publication Data

US 2017/0061540 A1    Mar. 2, 2017

Related U.S. Application Data

(63) Continuation of application No. 13/558,974, filed on Jul. 26, 2012, now abandoned.
(Continued)

(51) Int. Cl.
   *G06Q 40/04*   (2012.01)
(52) U.S. Cl.
   CPC .................................. *G06Q 40/04* (2013.01)
(58) Field of Classification Search
   CPC ....................................................... G06Q 40/04
(Continued)

(56) References Cited

U.S. PATENT DOCUMENTS

| 8,103,556 B2 | 1/2012 | Robinson |
| 9,002,741 B2 | 4/2015 | Rohlfs |

(Continued)

FOREIGN PATENT DOCUMENTS

| KR | 20100061637 A | 6/2010 | |
| KR | 20100135088 A | 12/2010 | |
| WO | WO-2012134497 A1 * | 10/2012 | ............. E21B 43/00 |

OTHER PUBLICATIONS

Shang-Jin Wei, Currency Hedging and Goods Trade, National Bureau of Economic Research Working Paper No. 6742 (Year: 1998).*

(Continued)

*Primary Examiner* — Eric T Wong
*Assistant Examiner* — Kevin T Poe
(74) *Attorney, Agent, or Firm* — Stephen T. Olson; Harness, Dickey & Pierce, P.L.C.

(57) ABSTRACT

A system for a computerized, Exchange-controlled network ("ECN") is disclosed which is operated by an organization forming an Exchange. The ECN has at least one host server disposed at a first location which communicates with at least two front-end virtual servers disposed at second and third locations, wherein the servers are attendant to Exchange-authorized communities of interest ("COI") each made up of at least one member, and thus authenticated to cryptographically validate and process digital information passed along the ECN without the use of intermediaries. A plurality of devices in the form of dongles are each configured to operate in conjunction with their respective COI member's server, and enable the Exchange to exercise controls over virtually all aspects of digital data access and digital order processing without the use of intermediaries.

10 Claims, 6 Drawing Sheets

Related U.S. Application Data

(60) Provisional application No. 61/513,792, filed on Aug. 1, 2011.

(58) Field of Classification Search
USPC .......................................................... 705/37
See application file for complete search history.

(56) References Cited

U.S. PATENT DOCUMENTS

| | | |
|---|---|---|
| 2002/0198817 A1 | 12/2002 | Dhir |
| 2004/0039684 A1 | 2/2004 | Sandor |
| 2004/0059692 A1 | 3/2004 | Hill et al. |
| 2006/0184445 A1 | 8/2006 | Sandor et al. |
| 2006/0206408 A1* | 9/2006 | Nassiri ............... G06Q 30/0617 705/37 |
| 2007/0203855 A1 | 8/2007 | Fisher |
| 2008/0033833 A1 | 2/2008 | Senior |
| 2008/0059358 A1* | 3/2008 | Wardley ............... G06Q 40/00 705/37 |
| 2008/0177675 A1 | 7/2008 | Arginteanu |
| 2008/0255982 A1* | 10/2008 | Hughes ............... G06Q 30/0601 705/37 |
| 2008/0270284 A1* | 10/2008 | Cummings ............ G06Q 40/00 705/37 |
| 2008/0288386 A1* | 11/2008 | Ferris ............... G06Q 40/00 705/35 |
| 2008/0288416 A1* | 11/2008 | Arnott ............... G06Q 30/02 705/36 R |
| 2009/0119200 A1 | 5/2009 | Riviere |
| 2009/0271332 A1 | 10/2009 | Lo et al. |
| 2010/0010926 A1 | 1/2010 | Eckert et al. |
| 2010/0063902 A1 | 3/2010 | Constantz et al. |
| 2010/0153258 A1 | 6/2010 | Aggarwal et al. |
| 2010/0332275 A1 | 12/2010 | Walsh et al. |
| 2012/0054085 A1 | 3/2012 | Riviere |
| 2013/0036039 A1 | 2/2013 | Rohlfs |
| 2013/0036071 A1 | 2/2013 | Rouwenhorst et al. |

OTHER PUBLICATIONS

Pagani GA, Aiello, M, Energy market trading systems in G6 countries, www.mercatoeettrico.org (Year: 2004).*
Werthamer RIchard N, Raymond Susan, Technology and Finance: The Electronic Markets, North-Holland (Year: 1997).*
International Search Report for Application No. PCT/US2012/048924, ISA/KR, dated Mar. 11, 2013.
Written Opinion of the ISA for Application No. PCT/US2012/048924, ISA/KR, dated Mar. 11, 2013.
Second Office Action regarding Chinese Application No. 201280048460.0, dated Nov. 23, 2016.

* cited by examiner

| Description: Field/Country | Barrels Per Day (BPD) | API Gravity | Sulfur % Content | Weighted Average API Gravity | Weighted Average Sulfur Content |
|---|---|---|---|---|---|
| MEWA Extra Light Crude Oil | | | | | |
| Qatar Dukhan | 300,000 | 41.1 | 1.22% | 4.00 | 0.12% |
| Abu Dhabi Zakum | 300,000 | 40.9 | 1.03% | 3.98 | 0.10% |
| *Abu Dhabi (UAE) Murban | 1,200,000 | 39.6 | 0.79% | 15.43 | 0.31% |
| Arab Extra Light | 1,100,000 | 39.5 | 1.07% | 14.11 | 0.38% |
| Abu Dhabi Umm Shaif | 180,000 | 36.5 | 1.39% | 2.13 | 0.08% |
| Total MEWA Extra Light Crude Oil | 3,080,000 | | | 39.66 | 0.99% |
| MEWA Light Crude Oil | | | | | |
| Iran Lavan Blend | 92,000 | 35.2 | 1.78% | 0.39 | 0.02% |
| Abu Dhabi Upper Zakum | 455,000 | 34.0 | 1.89% | 1.88 | 0.10% |
| Iran Light | 1,500,000 | 33.4 | 1.36% | 6.09 | 0.25% |
| Iran Sirri | 120,000 | 33.3 | 1.79% | 0.49 | 0.03% |
| *Arab Light | 4,900,000 | 33.0 | 1.83% | 19.65 | 1.09% |
| Oman | 812,000 | 33.0 | 1.14% | 3.26 | 0.11% |
| Iran Doroud | 120,000 | 32.8 | 2.90% | 0.48 | 0.04% |
| *Qatar Marine | 230,000 | 32.7 | 1.85% | 0.91 | 0.05% |
| Total MEWA Light Crude Oil | 8,229,000 | | | 33.15 | 1.69% |
| MEWA Medium Crude Oil | | | | | |
| Arab Medium | 850,000 | 30.5 | 2.56% | 3.41 | 0.29% |
| *Kuwait Export | 2,000,000 | 30.5 | 2.60% | 8.03 | 0.68% |
| Dubai Fateh Dubai UAE | 54,000 | 30.4 | 2.13% | 0.22 | 0.02% |
| Iraq Basrah | 1,600,000 | 30.2 | 2.52% | 6.36 | 0.53% |
| Iran Foroozan | 300,000 | 30.1 | 2.31% | 1.19 | 0.09% |
| Iran Heavy | 1,400,000 | 29.5 | 1.99% | 5.44 | 0.37% |
| Khafji, Neutral Zone | 240,000 | 28.5 | 2.85% | 0.90 | 0.09% |
| Qatar Al-Shaheen | 300,000 | 28.0 | 2.37% | 1.11 | 0.09% |
| Arab Heavy | 850,000 | 27.6 | 2.94% | 3.09 | 0.33% |
| Total MEWA Medium Crude Oil | 7,594,000 | | | 29.75 | 2.49% |

FIG. 2

COMPUTERIZED EXCHANGE CONTROLLED NETWORK SYSTEM AND RELATED METHOD

CROSS-REFERENCE TO RELATED APPLICATIONS

This is a continuation of U.S. Ser. No. 13/558,974, filed Jul. 26, 2012; which claims the benefit of U.S. Provisional Application No. 61/513,792, filed on Aug. 1, 2011. The disclosures of the above applications are incorporated herein by reference in their entirety.

FIELD

The present teachings generally pertain to systems and methods for energy market hedging, and particularly to a computerized exchange controlled network able to exercise controls over virtually all aspects of data access and order processing of various types of tradable assets, without the use of intermediaries.

BACKGROUND

The statements in this section merely provide background information related to the present disclosure and may not constitute prior art.

Historically, the prices of a large number of fossil fuels such as crude oils and refined products have been set either by oil producing countries or determined by the spot market. The Organization of Petroleum Export Countries (OPEC) official selling price system for all intents and purposes ruled the crude oil market from the early 1970's to 1985. Under the OPEC price system, most crude oil sales were transacted as part of long-term contracts having fixed prices and volumes, with price adjustments made infrequently. However, over the years, more crude oil trade has taken place using spot and futures prices and contract sales have entailed shorter durations and more flexible terms.

Spot pricing has become widely accepted in energy markets since the U.S. opted to deregulate energy prices about 30 years ago. Under the spot pricing system, many different crude oil prices are set differentially to the price of one or more benchmarks. Crude oil benchmarks (also known as "markers") were introduced in the mid 1980's. Most term contracts are now linked to the spot prices of benchmark crude oils, rather than priced at an outright level.

The use of futures and options contracts for energy commodities became more popular in the 1980's, more than a century after commodity exchange trading commenced in the U.S. and Europe. Futures contracts enable owners of assets to obtain price protection against adverse price movements. The buyer is obligated to purchase an asset (or the seller to sell an asset) at a predetermined future date and price. Futures contracts specify the quality and quantity of the underlying asset and are standardized to facilitate trading on exchanges that are typically registered with and regulated by one or more governmental organizations.

While holders of futures contracts are obligated to buy or sell the underlying asset at expiration, an options contract gives the holder the right to buy or sell. Thus, options can be a used as means to hedge futures contracts.

Whereas futures and options contracts are traded over a centralized exchange, another form of hedging involving use of over-the-counter (OTC) derivatives agreements has gained popularity, albeit amid mounting controversies and closer scrutiny from government regulators, as well as the population at large. OTC derivatives are bilateral contracts whereby two parties agree on how a particular trade is settled in the future, with the 3 most common contract types being:

Forwards: agreements to exchange at some fixed future date a given quantity of a physically delivered commodity for a currently defined price.

Swaps: financial agreements settled by cash rather than any transfer of the underlying commodity, which provides price protection for an agreed quantity of a commodity on an agreed future date (usually greater than one month but less than 2 years after the trade date).

Spreads: agreements designed to allow producers to lock in differentials between commodity prices at different times ("calendars") or between different commodities ("cracks"); in either case, the purchaser/producer pays a pre-agreed fixed spread level in exchange for a floating spread level obtained from the provider in transactions that are usually financially settled.

Most OTC derivatives involve the use of intermediary banks, rather than any centralized exchange, to serve as counterparties matching buyers with sellers. In the process of becoming prominent (if not dominant) OTC derivatives dealers, some of the world's largest banks stand accused of making markets that lack transparency (i.e., in terms of price discovery, volume and counterparty risk) in order to generate large profits at the risk of incurring major losses in the event that counterparties fail to honor their committed trade obligations.

OTC derivatives drew heavy criticism in the aftermath of the Enron scandal of about 2001 and more recently came under even closer scrutiny as the unbridled proliferation of Credit Default Swaps and other OTC instruments led to the demise of Bear Stearns, Lehman Brothers, AIG et al, as well as the ensuing financial crisis that morphed into the Great Recession. As a result, several regulatory initiatives have emerged globally to alter the future of OTC derivatives use. The goal of these regulatory initiatives is to ensure that private contracts between counterparties will become transparent instruments settled by central clearinghouses imposing stricter margin policies to enhance credit risk management and publish more fulsome order, price and volume data.

Major regulatory initiatives on the docket include the Dodd-Frank Wall Street Reform and Consumer Protection Act and similar measures being pursued outside the U.S.; more rigorous capital, leverage and liquidity standards from the Basel Committee on Banking Supervision; and International Financial Reporting Standard No. 9 promulgated by the International Accounting Standards Board. The initiatives call for, inter alia, substantial changes in classifying and measuring financial instruments, the wider use of "mark-to-market" rules and increased hedge accounting and disclosure requirements, as well as for the instruments to be centrally cleared and settled by qualified clearinghouses imposing margin rules. In all likelihood, such initiatives will intensify regulatory capital pressures on banks and affect the ability of, and the means by which, banks maintain their liquidity. As a result, some banks will undoubtedly be curtailed if not precluded from dealing in OTC derivatives and in that process the types traded in the past may become less liquid and thus less attractive to trade.

In most cases involving exchange-traded energy futures and options, as well as OTC derivatives, benchmarks indicate crude oil quality and geographic location. They are useful referencing tools for buyers and sellers because there are so many varying grades of crude oil produced throughout the world. According to the *International Crude Oil Market Handbook* published by the Energy Intelligence Group, there are around 200 crude oil blends produced in 46 countries, all varying in terms of characteristics, quality and market penetration. Following are the most common crude oil benchmarks used in global commerce:

West Texas Intermediate (WTI) is light sweet crude oil with 39.6° American Petroleum Institute (API) gravity, 0.24% sulfur content and a delivery point in Cushing, Okla. (USA). Although WTI is a U.S. grade of crude oil, it has attained global benchmark status, inter alia because WTI futures and options contracts amassed substantial trading volume gains in the past decade or so from speculators and financial investors around the world. In addition to being a spot market bench-mark, WTI futures and options trade in denominations of 1,000 barrels per contract at the CME Group Nymex (formerly New York Mercantile Exchange) and at the Intercontinental Exchange (ICE) in London.

Brent is comprised of five (5) light sweet crude oil grades with blended API gravity of 38.06° and 0.37% sulfur content. Sourced from the North Sea and refined mostly in NW Europe, Brent is also touted as a global benchmark, in particular for large tanker shipments heading west to N. America from Europe, Africa and the Middle East. Brent futures and options are primarily traded at the ICE in denominations of 1,000 barrels per contract. Prior to September 2010, there were typically fairly small WTI-Brent price differentials (+/−$3 per barrel, with WTI usually exceeding Brent due to higher quality API gravity and lower sulfur content). However, in late 2010, differentials diverged from the previous norm, expanded and eventually exceeded $18 per barrel in March 2011—with Brent exceeding WTI— due to a variety of factors detailed later herein, all of which has prompted concerns about the extent to which Brent and WTI will be able to maintain their status as global benchmarks.

DME Oman Crude Oil futures and options are listed at the Dubai Mercantile Exchange (DME; a collaborator and affiliate of the CME Group), traded in denominations of 1,000 barrels per contract and specified as having API gravity of 31.0°, 2.0% sulfur content and a delivery point in Oman. DME was launched in June 2007 with a goal to bring about fair and transparent price discovery and efficient risk management to the East of Suez market, considered the fastest growing commodities market and largest crude oil supply and demand corridor in the world. DME Oman Crude Oil is the explicit and sole/official selling price benchmark for Oman (output of 812,000 barrels per day or bpd) and Dubai (output of 54,000 bpd but in decline), which have purportedly been viewed (at least by the DME) as markers for heavy sour ME crude oil grades exported to the Asia-Pacific region. However, due to some limitations associated with inter alia an Oman delivery point and the relatively small output of marker oil fields in Dubai and Oman, the average daily volume (ADV) of DME Oman Crude Oil futures and options contracts are arguably well below the levels reasonably expected for a viable global (or even regional) benchmark, to the point such that, as of the end of 2009, the CME Group elected to write off the $28.6 million carrying value of its investment stake in the DME because it was impaired. Argus Sour Crude Index (ASCI) is listed at the CME Group's Nymex and the ICE. ASCI is based on three medium sour Gulf of Mexico crudes (Mars, Poseidon and Southern Green Canyon) with a blended average of 29.3° API gravity and 2.03% sulfur targeted for processing by U.S. Gulf Coast refineries. So far, ASCI has been adopted as a benchmark (subject to a myriad of differential adjustments) for spot market sales by Saudi Aramco and Kuwait Petroleum (in 2009) and Iraq's Somo (in 2010). ME crude oils priced against ASCI include Arab Extra Light, Arab Light, Arab Medium, Arab Heavy, Kuwait Export Blend, Basrah Light and Kirkuk. While ASCI might well be more suitable than the light sweet WTI and Brent benchmarks for spot markets and long-term contract arrangements negotiated by ME exporters with U.S. Gulf Coast refineries, ASCI pricing and other methodology (see www.argusmedia.com/methodology) is arguably too cumbersome to generate efficient futures and options contract trading on a wider global scale, especially in connection with ME exports to East of Suez markets, which inter alia include India, Singapore, Hong Kong, China, Taiwan, South Korea and Japan.

Urals is a reference oil brand used as a basis for pricing a principally Russian export oil mixture (specified with 31.8° API gravity and 1.35% sulfur) extracted from the Urals and Volga regions along with lighter crude oils from Western Siberia. It is supplied through the Novorossiysk pipeline system and over the Druzhba pipeline. Urals futures trade on the Russian Trading System (stock exchange), as well as at the CME Group's Nymex, where it is known as Russian Export Blend Crude Oil (REBCO). While Urals are not yet material to the context of this hedging apparatus, they are nonetheless noted due to the planned increase of crude oils to be exported from Russia to China over the newly opened ESPO (Eastern Siberia to Pacific Ocean) pipeline delivering Russian oil to energy hungry China.

In assessing the benchmarks noted above, it becomes clear that, for all intents and purposes, the CME Group's Nymex and the ICE, along with their affiliated exchanges around the world, enjoy a virtual duopoly in the global crude oil futures and options trading arena, as currently shaped. Perhaps more than anything else, this reflects the fact that WTI and Brent are prime light sweet crude oils coveted by highly regulated refineries for their low sulfur content and efficiency in generating high quality refined products. Compared to ME crudes having relatively lower API gravity and higher sulfur content, WTI and Brent are much easier to refine into cleaner gasoline (generally 30 ppm sulfur content) and diesel (generally 10-15 ppm sulfur called ultra-low-sulfur or ULSD) fuels mandated by U.S., West European and other (OECD) government environmental protection agencies (EPAs).

However, that model is not practicable for the rest of the world, where sulfur levels in gasoline and diesel fuels often amount to 500 ppm in major developing countries and several thousand ppm in others. Huge investments would be required for those countries to substantially change over (or build new) refineries to implement cleaner engine, fuel and emission control programs, which could take decades to rationalize and fund. That assumes it would even be feasible or affordable to do so, at all, since the light sweet crude oil phenomenon known as Peak Oil (discussed more fully later herein) lurks in the background. In that event, creating even greater (non-OECD) demand for light sweet crude oil resources would likely cause hyper-inflation on a global scale capable of crashing most, if not all economies. That approach seems foolish, even wasteful, considering that there are much larger (and growing) reserves of relatively heavier and sour crudes that can be tapped well into the future.

WTI and Brent futures and options traded at CME Group's Nymex and the ICE have appealed to Western/OECD buyers and sellers, especially those indulged speculators who have skyrocketed their open interests while creating volatile/spiraling prices via high frequency trading programs that demand trade execution speeds of single digit milliseconds (and headed for microseconds), thereby driving ADV to record heights. WTI and Brent have also been tolerated in the past by ME exporters and their customers wanting to hedge but lacking better alternatives. In doing so, they have resorted to complex Platts and Argus (specialist energy publishers) assessment-based OTC derivatives, often using one or the other as their benchmark but requiring numerous differential adjustments, an overly complex and increasingly inefficient exercise due inter alia to increasingly apparent flaws with these benchmarks.

As mentioned above, the WTI-Brent spread has gone from being relatively tight to a scenario whereby WTI now sells at a considerable (often $10+ per barrel and recently $18+ per barrel) discount to Brent, even though WTI is higher quality crude and it costs extra to ship Brent to the U.S. This anomaly may be attributed to several factors.

First, having WTI's delivery point in Cushing, Okla., is limiting and storage has become problematic, even though capacity has steadily been raised to handle an influx of Canadian crudes coming in via pipeline, along with the new oils produced in North Dakota that have caused aggregate U.S. crude output to just increase for the first time in 23 years. Because it is easier to move oil from major producing regions to Cushing than to move oil from Cushing to refineries (especially U.S. Gulf Coast refineries that also import ME crudes) and consumers, the supply bottle-necks being created there are not expected to go away any time soon. WTI prices are expected to remain in a substantial discount mode (to Brent) and thus be less appealing to traders of ME crude oils.

Further complicating matters, North Sea oil production is declining while European and Asian (especially Chinese) demand for diesel and other distilled products has increased. It should be noted that, whereas WTI tends to generally be more favorable for gasoline products, Brent generally tends to favor production of diesels and other distillates. Thus, added distillate demand for Brent in the face of lower North Sea production has caused supplies to decline and prices to rise. Adding to the fray is the recent turmoil in Africa (especially countries with desirable low sulfur crudes, such as in Libya) and the ME that will not likely be resolved any time soon and could grow worse, all of which currently tends to be reflected more in Brent prices than WTI. The bottom line is that WTI and Brent each have exposed flaws that are causing traders to question their viability as global benchmarks, especially as it relates to crude oils produced in the ME.

SUMMARY

The present disclosure relates to a computer controlled Exchange-controlled network ("ECN") operated by an Exchange. The ECN may comprise at least one host server disposed at a first location and being in communication with at least two front-end virtual servers disposed at second and third locations, wherein the servers are attendant to Exchange-authorized communities of interest ("COI") each made up of at least one member, and thus authenticated to cryptographically validate, process, transmit and receive pre-approved digital information passed along the ECN without the use of intermediaries in a chain of communications. A plurality of dongles are used which each include hardware and software. Each dongle is uniquely configured to operate in conjunction with its respective COI member's server, enabling the Exchange to exercise controls over who can access what data at any given time, where the data is stored and who manages various storage needs and server networks, regardless if the various storage needs are at a front-end or at a host end of the ECN. The dongles enable buy and sell orders of digital ETD contracts to be cryptographically authenticated, posted and ultimately matched, executed and confirmed as trades to be cleared, settled and reported contemporaneously over the ECN in compliance with policies and rules established by the Exchange, and without the use of intermediaries in the chain of communications.

Global growth has increased physical demand for differentiated commodities and price volatility. As a result, there is a strong need for transformative risk management innovations in the field. Addressing that need, this invention specifies novel processes without parallel or counterpart in previous energy and other tradable asset hedging practices. They are transformative in that they facilitate substantive ETD customization by employing standardized instruments. This is accomplished via the synergistic use of weighted average benchmarks configured from exchange-defined sets of discrete tradable assets along with complementary differential indexes formulated to value varying qualitative and logistics properties, the type that customarily add to or detract from a tradable asset's intrinsic market value.

In addition, this invention specifies a fundamentally new type of computerized database technology for exchange-controlled networks featuring dongles comprised of hardware and/or software tailored for attendant front-end virtual servers and host servers, respectively, with cryptographic security distributable across authenticated members of globally dispersed cloud communities of interest in a trusted exchange-controlled manner, thereby defining all aspects of who has access to what while effectuating the synergistic impact of the aforementioned embodiments. Said technology creates a substantive foundation for solving problems and seizing efficiency opportunities that can re-invent the aging, costly and hack-prone legacy IT systems and infrastructures known to currently populate the field.

In summary, the fundamentally new type of computerized technology recited in this invention is not merely a generic computer structure currently used in the field; nor does it merely perform generic functions that are well understood, routine and conventional activities previously known to industry practitioners. Rather, it provides a transformative ETD platform solution that will contemporaneously and more transparently meet formidable risk management challenges posed by increases in physical demand for tradable assets forward-valued in vitally important markets throughout the world.

The drivers of this novel energy hedging system are crude oil and refined product benchmarks noted below alongside certain relevant information obtained from the Energy Intelligence Group's 2010 study titled Crude Oils and their Key Characteristics:

Middle East Weighted Average (MEWA) Extra Light Crude Oil yielding a weighted average blend API gravity of 39.66° and sulfur content of 0.99%, comprised of the following:

Saudi Arabian Extra Light (API gravity of 39.5° and sulfur of 1.07%)

Abu Dhabi (UAE) Murban (API gravity of 39.6° and sulfur of 0.79%)

Abu Dhabi Umm Shaif (API gravity of 36.5° and sulfur of 1.39%)

Abu Dhabi Zakum (API gravity of 40.9° and sulfur of 1.03%)

Qatar Dukhan (API gravity of 41.1° and sulfur of 1.22%)

MEWA Light Crude Oil yielding a weighted average blend API gravity of 33.15° and sulfur content of 1.69%, comprised of the following:

Saudi Arabian Light (API gravity of 33.0° and sulfur of 1.83%)
Iran Light (API gravity of 33.4° and sulfur of 1.36%)
Oman (API gravity of 33.0° and sulfur of 1.14%)
Abu Dhabi Upper Zakum (API gravity of 34.0° and sulfur of 1.89%)
Qatar Marine (API gravity of 32.7° and sulfur of 1.47%)
Iran Lavan Blend (API gravity of 35.2° and sulfur of 1.78%)
Iran Sirri Island (API gravity of 33.3° and sulfur of 1.79%)
Iran Daroud (API gravity of 32.8° and sulfur of 2.90%)

MEWA Medium Crude Oil yielding a weighted average blend API gravity of 29.75° and sulfur content of 2.49%, comprised of the following:

Saudi Arabian Medium (API gravity of 30.5° and sulfur of 2.56%)
Kuwait Export (API gravity of 30.5° and sulfur of 2.60%)
Iran Foroozan (API gravity of 30.1° and sulfur of 2.31%)
Iraq Basrah (API gravity of 30.2° and sulfur content of 2.52%)
Fateh Dubai UAE (API gravity of 30.4° and sulfur of 2.13%)
Iran Heavy (API gravity of 29.5° and sulfur of 1.99%)
Khafji Neutral Zone (API gravity of 28.5° and sulfur of 2.85%)
Qatar Al-Shaheen (API gravity of 28.0° and sulfur of 2.37%)
Saudi Arabian Heavy (API gravity of 27.6 and sulfur of 2.94%)

Unleaded gasoline (95 RON) with 500 ppm sulfur content
Gasoil (diesel fuel) with 500 ppm sulfur content
Heavy fuel oil (HSFO 180) with 35,000 ppm sulfur content Crude oil is a myriad of organic compounds that vary from one oilfield to another. Carbon and hydrogen typically make up over 95% of crude oil content. Crude oil is classified inter alfa as paraffinic, napthemic, aromatic or asphaltic based on their proportion of hydrocarbon series molecules, a key indicator of their physical and chemical properties. Remaining crude oil content is typically made up of sulfur (often ranging from 0.25%-3.00%), as well as nitrogen, oxygen, metals and salts (<1% for each). The exact composition determines the product mix obtainable from the crude oil and its relative ease of being refined. Each refiner's valuation assessment tends to be relatively unique, depending on the refining technology it employs.

Crude oil quality is best determined by an assay test, which provides volumetric and weight yields of standard distillation fractions expected when the oil is refined into products such as gasoline, diesel fuel, kerosene and jet fuel, as well as non-vaporized residuals usable as fuel oil. Assays indicate key characteristics of raw crude oil, including gravity, sulfur content, viscosity, pour point and volatility. The energy market hedging system described herein is principally focused on the variability of API gravity and sulfur content among crude oils produced at ME oil fields. As noted, they have a 13.5° API gravity differential (Qatar Dukhan versus Saudi Arabian Heavy) and 2.15% sulfur content differential (Saudi Arabian Heavy versus Abu Dhabi Murban).

API gravity, the most commonly used density scale, is a measure of how heavy or light any petroleum liquid is to water. The higher the API gravity number, the lighter the crude. Crude oils with low carbon, high hydrogen, and high API gravity tend to be rich in paraffin and yield greater portions of gasoline and light petroleum products. Although precise definitions vary according to the petroleum province and marketing circumstances, generally crude oil gravity under 20° is considered heavy; 20°-34° is considered medium and over 34° is considered light. All other factors considered equal, the higher the gravity, the greater the value of the crude oil.

Sulfur content, traditionally expressed in terms of a percentage or parts per million (ppm), is another important aspect of crude oil quality. All other factors considered equal, the greater the sulfur percentage, the lower the quality (and value) of the crude oil. Sulfur volumetrically reduces the Btu content of crude oil, is corrosive to refineries and pipelines and thus produces lower value products. As a general rule, heavy crude oils tend to have a greater proportion of sulfur because it binds easily to heavy molecules. The same is true for petroleum products with sulfur usually being concentrated in heavy fuel oils (residuals). However, it is not always the case, and it is not necessarily a linear relationship; thus, the percentage of any particular crude oil's sulfur content is usually cited along with its API gravity.

When considering the impact of quality on refiners' demands for particular crude oils and the prices they are willing to pay, it is important to understand that such demand is derived mainly from the value of the products the crude oil will produce, which essentially depends on the cost of refining that crude and the revenue stream expected from its refined products. Rising or falling refined product prices do not have a uniform impact on all types of crude oil. If gasoline prices rise or heavy fuel oil prices fall, there may well be an impact on relative crude oil prices. Certain product price adjustments cause some refiners to buy a lighter mix of crude oils as they seek to produce more gasoline and less heavy fuel oil. This, in turn, will likely cause the price differential between various grades of crude oil to change, with heavy crude oil prices selling at a greater discount to light crudes. Likewise, unexpected breakdowns in desulfurization equipment at key refineries can change the relative value of sour and sweet crudes.

In the last few decades, EPA regulations have impacted energy prices, essentially by causing the demand for light sweet crude oil to intensify. Businesses and governments in wealthy OECD countries have spent many billions of dollars on gasoline and diesel fuel desulfurization initiatives intended inter alia as technology enablers for clean new engines and emission control systems designed to reduce pollutants, especially particulate matter (PM), NOx and SO2. A classic example is what has occurred in connection with diesel fuels.

Sulfur levels in diesel fuels employed by highway and non-road vehicles were for a long time limited to 0.5% (5,000 ppm) per ASTM international standards. During the 1990's, fuel quality became more regulated by EPAs, with the first major move dropping the limit to a then "low" level of 0.05% (500 ppm), driven at the time by legitimate desires to reduce sulfur's impact on PM emissions, especially sulfate particulates in the form of tiny hydrated sulfuric acid droplets. Running parallel with fuel desulfurization initiatives were new engine technologies and diesel particulate filters (DPFs) designed to burn soot (uncombusted hydrocarbons) in the exhaust. In order to help compensate for the relatively low exhaust temperature profiles of vehicles caught in typical urban stop-and-go drive cycles, precious metal catalyzed DPFs were designed to lower soot ignition temperatures. Unfortunately, it is proven that catalyzed DPFs are vulnerable to sulfur poison, which required lowering sulfur content levels, ultimately way below 500 ppm.

According to the Diesel Emission Control—Sulfur Effects (DECSE) Project Summary of Reports produced for the U.S. Department of Energy (DOE) by National Renewable Energy Laboratory (www.nrel.gov/docs/fy02osti/31600.pdf), catalyzed DPFs are capable of eliminating 95% of PM when diesel fuel with 3 ppm (0.0003%) sulfur content is used, albeit that is a commercially rare fuel. However, PM reduction efficiency falls to 67% when 30 ppm sulfur fuel is burned and drops all the way down to 0% efficiency with 150 ppm level fuel. As sulfur levels go beyond 150 ppm, an increase in the counteractive conversion of SO2 gases to sulfate-laden PM takes place—reflecting the impact of high exhaust temperatures (favoring SO3 production) and presence of precious metal catalysts to oxidize SO2 gases—to the point where PM emissions more than double baseline levels when 350 ppm sulfur diesel fuel is employed.

Thus, the U.S. and other OECD countries have opted to mandate ULSD fuels (10 to 15 ppm), in essence to mitigate counteractive SO2 conversion and prevent catastrophic sulfur poison failure of expensive emission control systems using catalyzed DPFs. Because they are unable to rationalize or afford OECD-centric engines, emission control systems and ULSD fuel, most other countries around the world commonly employ fuels ranging from 350 ppm to several thousand ppm sulfur content.

OECD countries and businesses implementing the initiatives noted above spent many billions of dollars changing over refineries and pipelines to desulfurize and refine crude oil into compliant ULS fuels complementing new engines and emission controls systems. Unfortunately, those emission control systems not only remain vulnerable to sulfur poison failures but concerns have surfaced regarding their unintended adverse health consequences, e.g. toxic volatile ultrafine and nano-sized PM that nonetheless escape the tailpipes of clean new vehicles equipped with catalyzed DPF after-treatment systems, as reported by the Health Effects Institute on Mar. 14, 2011 in its report titled *The Future of Vehicle Fuels and Technologies: Anticipating Health Benefits and Challenges* (http://pubs.healtheffects.org/getfile.php?u=634). At a minimum, developing countries will "wait-and-see" what transpires from those issues while they assess the extent to which they could ever fund all the costs needed to implement similar measures.

In any event, whilst mandated fuel sulfur limits fell from 5,000 to 500 to ultimately 10-15 ppm, the ensuing demand for light sweet crude oil exacerbated Peak Oil fears that the world will be unable to affordably meet all of the energy needs of industrialized, as well as emerging and developing countries, seeking economic expansion. Peak Oil fears, along with the machinations of those indulged speculators spiking WTI and Brent ADV at CME Group's Nymex and the ICE, have instilled a strong "net-long" trading bias that is highly correlated with volatile and rising fuel prices, and indirectly linked with rising food prices caused by renewable fuels programs such as ethanol (corn) and bio-fuels (soy beans) designed to supplement/replace fossil fuels.

Extending beyond emission control measures focused on populated land mass areas, certain EPAs recently coordinated with the International Maritime Organization (IMO) to establish more stringent standards for oceangoing vessel (OGV) emissions. OGVs include inter alia passenger yachts, ships, and oceanliners, container ships, bulk carriers, ro-ro ships, reefers, crude oil, chemical and gas tankers, tug boats and naval vessels. OGVs carry about 90% of world trade (including two-thirds of all crude oil and refined products globally consumed) covering tens of trillions in tonne-miles per year. Although vessel owners consider their relative environmental footprints to be light compared to other transport modes, they indisputably emit massive amounts of air pollution as their engines burn heavy residual and distillate fuels with high sulfur content, often several thousand times that of ULSD fuels.

Effective Jul. 1, 2010, shippers started facing regulations to either burn fuels with lower sulfur content or install after-treatment solutions that represent sustainable alternatives to newly promulgated fuels by causing equivalent reductions in SOx/SO2 to help eliminate PM and other pollutants. Currently, OGVs inside designated Emission Controlled Areas (ECAs, generally within 200 miles of major coastal ports) must burn fuels containing less than 10,000 ppm sulfur, a limit that is scheduled to drop to 1,000 ppm in 2015. Elsewhere (on the high seas), the IMO called for OGV fuel sulfur limits to be reduced in January 2012 from 45,000 ppm to, 35,000 ppm (or an after-treatment equivalent), then to 5,000 ppm in 2020, although the latter is contingent on the results of a fuel availability study to be completed in 2018.

Newly promulgated OGV fuels are expected to cost considerably more (60+% is already evidenced) than heavy fuel oils (residuals) hitherto employed, many of which are key byproducts of ME refiners. Their future adoption could further exacerbate Peak Oil concerns by impeding efforts to globally balance crude oil reserves, production and refinery output in an orderly fashion; ergo, the contingency associated with 2018 fuel availability study.

As expected, companies are actively vying to offer sustainable after-treatment solutions. So far, most come in the form of marine scrubber systems designed to exploit the natural buffering capacity of seawater to desulfurize OGV exhaust gases (SO2) and discharge the purportedly harmless effluent into the sea. Those and other technological developments, as well as more regulatory actions, are expected to create ongoing price volatility tied to sulfur content in the years ahead.

Barring major technological breakthroughs, most developing and lesser developed countries cannot afford (without considerable OECD subsidies) costs of implementing similar programs. However, as more sophisticated refinery capacity comes online in Asia and the ME later this decade and the next to process relatively heavier and sour crude oils, viable initiatives should emerge that are capable of reducing gasoline and diesel sulfur levels from several thousand to 500 ppm, if not lower, on a wider scale. Such developments will no doubt affect supply and demand for the varying grades of ME crude oils and thus create relative market price volatility.

Thus, the following complementary indexes have been designed to enable traders engaged over the attendant global energy exchange referred to hereafter as Global Energy e-Bourse or the "Exchange" to transparently trade quality/value differentials associated with API gravity and sulfur content:

Crude Oil API Gravity Value Index based on 1.0° differentials between the operative crude oil benchmark and the actual crude oil to be delivered in cases where futures contracts are settled by physical delivery ("EFP Futures")

Crude Oil Sulfur Content Value Index based on 0.1% differentials between the operative crude oil benchmark and the actual crude oil to be delivered in cases where EFP Futures are traded Gasoil (Diesel Fuel) Quality Value Index based on 500 ppm differentials in sulfur content between the operative gasoil benchmark and the actual gasoil to be delivered in cases where EFP Futures are traded Residual (Heavy Fuel Oil) Quality Value Index based on 5,000 ppm differentials in sulfur content between the operative heavy fuel oil benchmark and the actual heavy fuel oil to be delivered in cases where EFP Futures are traded Tanker transit and warehouse lease rate indexes are also tied to this system. As noted above, OGVs carry two-thirds of all crude oil and refined products globally consumed. That is particularly the case for ME crude oils and refined products exported via tanker deliveries to customers located throughout the world, especially in the growing East of Suez market. The most common tanker vessels carrying ME cargo are (i) very large crude carriers (VLCC) hauling up to 2,200,000 barrels (320,000 DWT) of crude oil from the Arabian/Persian Gulf to the Louisiana coast (the only U.S. port area large/deep enough to handle VLCCs) and East of Suez markets; and (ii) Suezmax tankers, named for being the largest vessels able to transit the Suez Canal with full cargo loads (up to 1,100,000 barrels or 160,000 DWT of crude oil). Each vessel commonly carries several types or grades of crude and hulls are separated into up to 10 banks, allowing for multiple loads and discharges.

Shipping markets have grown ever-riskier as fluctuations in freight rates and ship prices have increased substantially in recent years. Various instruments currently exist to hedge those risks but seldom involve the relative transparency and security of a centralized commodity exchange. Instead, the OTC derivatives agreements typically entered into for risk management purposes often employ tanker brokers—intermediaries between ship owners and the charterers who use ships to transport cargo—that specialize in crude oil, gas, oil products or chemical tankers.

Since OTC derivatives now face new regulatory standards, the once-private contracts between tanker counterparties will likely be transitioned into more transparent instruments settled by central clearinghouses imposing stricter margin policies to enhance credit risk management and publish more fulsome order, price and volume data.

Recognizing these new demands, this invention's Global Energy e-Bourse provides the following tanker related indexes:

Tanker Transit Lease Rate Indexes (VLCC and Suezmax, respectively) facilitate the use of futures and options contracts designed to hedge or speculate as to future daily rates charged for tankers moving over the high seas in route to deliver their cargo. Those indexes can also be used in forward and swap agreements that will additionally trade at Global Energy e-Bourse.

Tanker Warehouse Lease Rate Indexes (VLCC and Suezmax, respectively) use futures, options, forwards and swaps to hedge or speculate as to future daily rates charged for tankers floating at sea to warehouse cargo inter alia with an expectation that it can be sold in the future at higher prices.

The present teachings provide a system for energy market hedging operative to manage adverse price movement risks faced by Middle East (ME) oil producers and refiners, as well as globally scattered parties purchasing, shipping, storing, processing and consuming varying grades of ME crude oil, gasoline, distillates and residual fuel oil, while offering authorized speculators potential profits from market price volatility.

The system comprises an all-electronic exchange platform executing orders over a secure web-based Cloud network dedicated to transparent trading of energy derivatives (inter alia futures, options, forwards, swaps and spreads) cleared and settled via physical delivery or cash payments facilitated by affiliated or independently contracted clearinghouses. The derivatives are linked to benchmarks and complementary indexes (including but not limited to those listed below) correlated with financial, logistical, geopolitical and environmental factors unique to developing countries employing a relatively wide range of petroleum quality grades conducive to practicably power economic growth, rather than ultra-low-sulfur fuels mandated by environmental protection regulators in developed countries advocating relatively stringent emission control standards and systems:

Middle East Weighted Average (MEWA) Extra Light crude oil

MEWA Light crude oil

MEWA Medium crude oil

Unleaded gasoline (95 RON) with 500 ppm sulfur content

Gasoil (diesel) with 500 ppm sulfur content

Heavy fuel oil (HSFO 180) with 35,000 ppm sulfur content

Crude Oil API Gravity Value Index based on 1.0° differential

Crude Oil Sulfur Content Value Index based on 0.1% differential

Gasoil (Diesel Fuel) Quality Value Index based on 500 ppm differentials in sulfur content Residual/Heavy Fuel Oil Quality Value Index based on 5,000 ppm differentials in sulfur content Gasoil Crack Spread (difference between specified volumes of 500 ppm Gasoil and MEWA Light Crude Oil)

Tanker Transit Lease Rate Indexes (VLCC and Suezmax, respectively)

Tanker Warehouse Lease Rate Indexes (VLCC and Suezmax, respectively)

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings. The details within the various views of the drawings will be understood to be drawn generally to scale.

FIG. 2 depicts examples of data regarding various crude oils produced in the Middle East, which underlie the aforementioned crude oil benchmarks and are subject to change from time to time;

DETAILED DESCRIPTION OF VARIOUS ASPECTS

Figure 1:
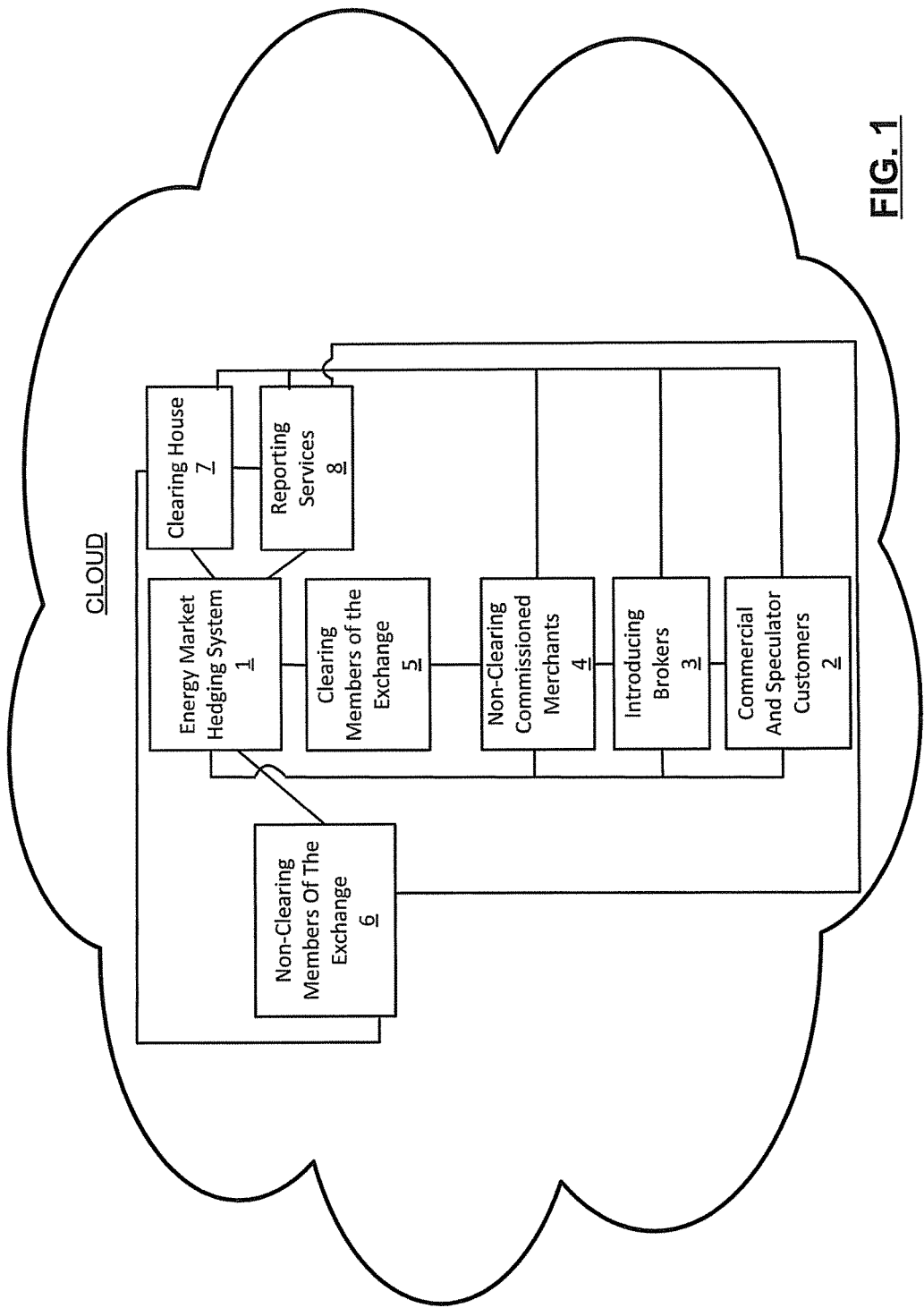
FIG. 1 illustrates the trading exchange data flow patterns using a system for energy market hedging in accordance with the present teachings.

The following description is merely exemplary in nature and is not intended to limit the present disclosure, application, or uses. It should be understood that throughout the drawings, corresponding reference numerals indicate like or corresponding parts and features. The description and any specific examples, while indicating embodiments of the present disclosure, are intended for purposes of illustration only and are not intended to limit the scope of the present disclosure.

Referring generally to FIG. 1, the trading exchange data flow patterns among various parties using a system for energy market hedging in accordance with the present teachings is illustrated and generally identified at reference character 1. The energy market hedging system 1 is incorporated into a secure web-based Cloud network centered around the energy market hedging system 1 and involving a global energy exchange also referred to as Global Energy e-Bourse or the "Exchange". The energy market hedging system 1 may be extended to the following authorized communities of interest (COI) linked around the world over a secure web-based Cloud network: commercial and speculator customers 2; introducing brokers 3; non-clearing commissioned merchants 4; clearing members of the Exchange 5; non-clearing members of the Exchange 6; clearing house 7; and reporting services 8.

The commercial and speculator customers 2 are exposed to market price volatility of Middle East (ME) crude oils and refined products varying as to quality (e.g., API gravity; sulfur content), geographic and tanker delivery characteristics. Thus, the customers 2 seek protection against future adverse market price movements by buying and selling standardized futures, options, forwards, swaps and spreads centrally traded over the Exchange, involving the use of proprietary ME-centric benchmarks and indexes.

Entitled intermediaries engaged between those parties noted directly above and the Exchange include the introducing brokers (IB) 3, non-clearing commissioned merchants (NCCM) 4 and clearing members of the Exchange 4 that are also commissioned merchants (CMCM). However, it should be noted that although those entitled intermediaries may be engaged in commercial relationships with certain Exchange customers noted above, they are not involved as intermediaries in the chain of Exchange communications, as described more fully below. The non-clearing members of the Exchange (NCMEs) 5 may conduct proprietary trading for their own account as well as for their managed clients' accounts.

Clearinghouses 7 and reporting services 8 may be contracted by the Exchange to clear, settle and report all executed trades while ensuring that credit risks are managed via required "marks-to-market" and the maintenance of customer margin deposits, as well as (where applicable) the guaranteed deposits of CMs.

In order to acquire and maintain authorized status, COI must employ Exchange-specified contracts, benchmarks and indexes, as well as Exchange-developed hardware, software applications and processes related thereto, all supplied to COI for use over the secure web-based Cloud network so that bids and offers will be authenticated, posted and ultimately matched, executed and confirmed as trades to be cleared, settled and reported in compliance with policies and rules established by the Exchange.

Following is a description of those key elements of the web-based Cloud network which are integral to the secure and effective conduct of Exchange business. They are broken into three (3) interdependent aspects noted below, which taken together, create a fluid pool of resources across all servers and data centers enabling COI to access all that is provisioned on an as-needed and authorized basis:

Front-end: The Exchange's front-end is globally populated by virtual servers acting as the flexible portion of the web-based Cloud network; in all, COI in more than 20 countries are expected to have virtual servers. They may take the form of users' independently employed digital devices such as personal computers, tablets, smart phones or even data interchange terminals tied to other trading systems (as permitted), subject to requirements that they must be (i) compatible with all Exchange-provided software applications and (ii) interconnected with an Exchange-supplied "dongle" described below. Alternatively, the Exchange can supply COI with its proprietary data interchange terminals containing the requisite software applications and dongle. Either way, front-end virtual servers inter alia perform the following functions:

receive digital information pertaining to all notifications from the Exchange re: the user's authorized status, as well as all software applications and updates provided by the Exchange;

confirm all relationships with entitled intermediaries, including the terms and conditions associated with commissions & fees (C&F), margin guarantees, etc.;

receive digital information pertaining to notifications from the Exchange re: all moneys payable or receivable in connection with open trades, settled trades and entitled intermediaries' C&F; and transmit digital information relating to trade orders to the Exchange in the form of bids and offers, which denote:
  digital information pertaining to Commodity type (including but not limited to Crude Oil, Unleaded Gasoline, Gasoil/Diesel or Heavy Fuel Oil) or index type (Crude Oil API Gravity Value, Crude Oil Sulfur Content Value, Gasoil Quality Value, Residual/Heavy Fuel Oil Quality Value, Gasoil/Diesel Crack Spread Differential Value, Daily Transit Lease Rate for Tankers, or Daily Warehouse Lease Rate for Tankers)
  digital information pertaining to Benchmark applied in the case of crude oil derived from one of several composites of oil fields located throughout the ME, computed on a weighted average (WA) basis (including but not limited to MEWA Extra Light, MEWA Light or MEWA Medium)
  digital information pertaining to Terms and delivery point (if FOB: Arabian/Persian Gulf or Suez); (if CIF: various)
  digital information pertaining to Type of contract (futures, options, forwards, swaps or spreads), as well as contract expiration and delivery date(s)
  digital information pertaining to Settlement type: financial (cash equivalent) or physical delivery (also referred to as Exchange Futures for Physical Delivery or "EFP")
  digital information pertaining to Bid or offer price and volume (in terms of number of contracts, each of which is denominated in the number of barrels or gallons or weight of the underlying commodity) receive digital information pertaining to confirmations of authorized executed trades from the Exchange;

receive digital information pertaining to notifications from the Exchange's clearinghouse re: required margin levels to be posted and maintained in connection with open trade positions and "marks-to-market", as well as notifications pertaining to digital information concerning clearance and settlement of trades, including details that depend on how/where they are to be settled (financially versus physical delivery);

receive digital information pertaining to reports of trade activity conducted at the Exchange (such as prices and volume associated with open bids and offers, as well as executed trades; and open interest and other historical trade data); and receive digital information pertaining to notification of all Exchange and clearinghouse policies and rules, as well as updates concerning all Exchange-specified futures, options, forwards, swaps, spreads, benchmarks, indexes, position limits and margin requirements.

Dongle: A dongle is a proprietary data storage hardware device loaded with software needed to inter alia provide security and authenticate virtual servers employed by the Exchange's COI. Dongles made according to Exchange specifications are supplied to COI either as (i) serialized USB thumb drives or stick devices connectable to independently employed servers, which require a PIN to reboot the server into an Exchange Cloud-enabled operating environment or (ii) an integral component of the Exchange's proprietary data interchange terminal. Dongles enable the Exchange to exercise controls over who can access what data at any given time, where data is stored and who manages the various storage needs and server networks, be they at the front or host end of the Exchange's web-based Cloud. Dongles facilitate transformational digital data protection via sophisticated encryption that bit-splits data from multiple slices (or shares) and adds authentication and fault tolerant information as it moves through the web-based Cloud network. This inter alia allows COI to share the same infrastructure without fear of other COI or the general population at-large accessing digital data that is not intended to be openly available.

Alternatively or additionally, authorized Exchange software downloads taking place at authenticated server hardware located over the Exchange's Cloud network may be used to facilitate transformational data protection described above.

Host Server: In addition to the front-end and dongle, proprietary storage networks (aka the host server) make up the last aspect of the Exchange's web-based Cloud network. The host server is configured to accomplish the following:

generate digital information to notify all virtual front-end servers of their authorized COI status, as well as all Exchange and clearinghouse policies, rules and updates concerning inter alia all Exchange-traded futures, options, forwards, swaps, spreads, benchmarks, indexes, position limits and margin requirements;

distribute all software applications and updates provided by the Exchange to authorized COI virtual servers;

receive digital information pertaining to all authenticated customer bids/offers, which are posted and matched with the posted offers/bids of other customers, resulting in confirmations of all executed trades, the data of which is also transmitted to applicable trade counterparties and entitled intermediaries, as well as to the Exchange's contracted clearinghouse and reporting service firm(s);

facilitate via digital information from the Exchange's contracted clearinghouse the posting/maintenance of all required margin levels based on the attendant open trade positions;

facilitate via the Exchange's contracted reporting service firm(s), digital information relating to the fulsome and accurate reporting of all trade activity conducted at the Exchange such as posted prices and volumes associated with open bids and offers, as well as executed open trades, open interest, settled trades and all other historical trade data;

based on digital information pertaining to confirmations received from applicable COI and underlying executed trade data, compute all C&F and other charges associated with each open and settled trade, and notify, through digital communications, all affected parties of their respective amounts payable or receivable in connection therewith; and provide a platform for digital information pertaining to account and payment management, alerts and entitlements in connection with the amounts noted directly above.

The host server is designed to be multi-faceted and scalable to sufficiently accommodate several Exchange offices posted around the world. The host server network has been designed to accommodate facilities dedicated solely to the Exchange and/or at qualified remote shared Cloud data resource centers independently contracted by the Exchange.

Accordingly, the present teachings provide a system for energy market hedging using a variety of digital data, digital information and digital communications, extended to authorized commercial and speculating parties that are exposed to market price volatility of ME crude oils and refined products with varying quality and geographic characteristics. The system for energy market hedging includes an all-electronic exchange platform dedicated to the transparent trading of energy derivatives, including but not limited to futures, options, forwards, swaps and spreads, all based on ME-centric benchmarks and indexes for global execution over a secure web-based Cloud network.

The system for energy market hedging of the present teachings considers the impact of proposed regulatory initiatives and enables the use of energy derivatives, such as forwards, swaps and spreads, to be traded in a manner that comports with a more stringent global regulatory environment.

In certain applications, it may be desirable to provide a system that permits execution of a derivatives trade, electronically, at a point somewhere in the Cloud communication chain, rather than at the host server located at the Exchange's headquarters. For example, host servers may be based in a particular country (e.g., the U.S.) to provide strategic and/or economic advantages.

Referring now to FIG. 2, a summary of Middle East-Centric Benchmarks and Complementary Indexes utilized by the system for energy market hedging is presented below. Crude oil benchmarks, each derived from a composite of ME oil fields, which are subject to change from time to time, include the following: 1) ME Weighted Average (MEWA) Extra Light Crude Oil (API gravity of 39.66° and sulfur content of 0.99%); 2) MEWA Light Crude Oil (API gravity of 33.15° and sulfur content of 1.69%); and 3) MEWA Medium Crude Oil (API gravity of 29.75° and sulfur content of 2.49%).

The system for energy market hedging further utilizes refined product benchmarks including the following: 1) Unleaded Gasoline (500 ppm sulfur), 2) Gasoil/Diesel (500 ppm sulfur) and Gasoil Crack Spread (between 500 ppm Gasoil and MEWA Light Crude Oil), and 3) Residual/Heavy Fuel Oil (35,000 ppm sulfur).

The system for energy market hedging further utilizes complementary differential value indexes including but not limited to the following: 1) Crude Oil API Gravity Value Index focused on variability of API gravity prevalent among crudes produced at ME oil fields, based on value associated with 1.00° differential; 2) ME Crude Oil Sulfur Content Value Index focused on variability of sulfur content prevalent among crudes produced at ME oil fields, based on value associated with 0.1% differential; the aforementioned crude oil differential indexes are structured for trade alongside the Exchange's crude oil EFP futures, valuing variances between the selected benchmark and actual crudes delivered; fee discounts apply when said indexes are traded as designed; 4) Gasoil (Diesel) Quality Value Index (attributable to each 500 ppm of sulfur content differential); and 5) Residual/Heavy Fuel Oil Quality Value Index (attributable to each 5,000 ppm of sulfur content differential).

The system for energy market hedging further utilizes Tanker Lease Rate Indexes, which focus on variability of costs and expenses factored in tanker leases—excluding fuel costs, which can be hedged via use of the Exchange's Residual/Heavy Fuel Oil futures and options: 1) Daily Transit Lease Rate Index tied to tankers (VLCC and Suezmax, respectively) earmarked for hauling ME crude oil to East of Suez destinations; and 2) Daily Warehouse Lease Rate Index tied to tankers (VLCC and Suezmax, respectively) earmarked for warehousing ME crude oil headed to East of Suez (also able to provide Transit and Warehouse Lease Rate Indexes for smaller crude oil and refined product tankers). Futures and options are priced in U.S. Dollars; other terms—e.g., based on a Global Reserves Basket Index comprised of a variety of commodity and currency asset classes commonly employed commercially in ME and East of Suez markets—can also be provided.

The system for energy market hedging further utilizes an EFP Qualification Process in which ME-Centric Crude Oil Futures are complemented by API Gravity Value and Sulfur Content Value Indexes. The EFP Qualification Process includes the following steps. Stage 1, ME crude oil meeting criteria noted below qualifies for delivery within the Exchange's assigned settlement period (per terms of respective EFP contract): To use MEWA Extra-Light crude oil benchmark, deliverable ME crude oil must be derived from an "Extra-Light" field or otherwise have API gravity >36° and sulfur content <1.4%. To use MEWA Light crude oil benchmark, deliverable ME crude must be derived from a "Light" field or otherwise have API gravity between 33° and 36° and sulfur content between 1.4% and 2.0%. To use MEWA Medium crude oil benchmark, deliverable ME crude must be derived from a "Medium" field or otherwise have API gravity between 30° and 33° and sulfur content between 2.0% and 2.9%. ME crude oil not meeting specific criteria per above may still qualify for settlement under EFP terms but must first be formally assigned an Exchange-authorized benchmark for trading.

Stage 2 (for ME crude oil meeting Stage 1 qualification): Cumulative API gravity and sulfur content differentials—derived by comparing actual (per Exchanged-recognized assay) and specified benchmark crudes—must also be settled at delivery.

For example, assume Party A (ME crude oil producer) holds a net short position of 800 contracts of MEWA Light Crude Oil EFP Futures expiring December 2012 and agrees to deliver 800,000 barrels of ME crude assayed as having API Gravity of 34° and sulfur content of 1.89%. Thus, Party A must also deliver the following: 1) 680 contracts (short) of Crude Oil API Gravity Value Index Futures expiring in December 2012; computed by multiplying 800 times the difference between the benchmark (33.15°) and the actual ME crude oil delivered (34°), or 680 contracts—in this case, short because the delivered crude is higher quality than the benchmark. 2) 168 contracts (long) of Crude Oil Sulfur Content Value Index Futures expiring in December 2012; computed by multiplying 800 times the difference between the benchmark (1.68%) and actual ME crude oil delivered (1.89%), or 168 contracts—in this case, long because the delivered crude is of lesser quality than the benchmark. Incomplete delivery of complementary index futures in manner described above will result in Exchange-imposed cash adjustments, which are a factor of the requisite number of complementary futures called for under the circumstances and any adverse effects of post-expiration market price moves, plus applicable fees levied by the Exchange.

Figure 3:
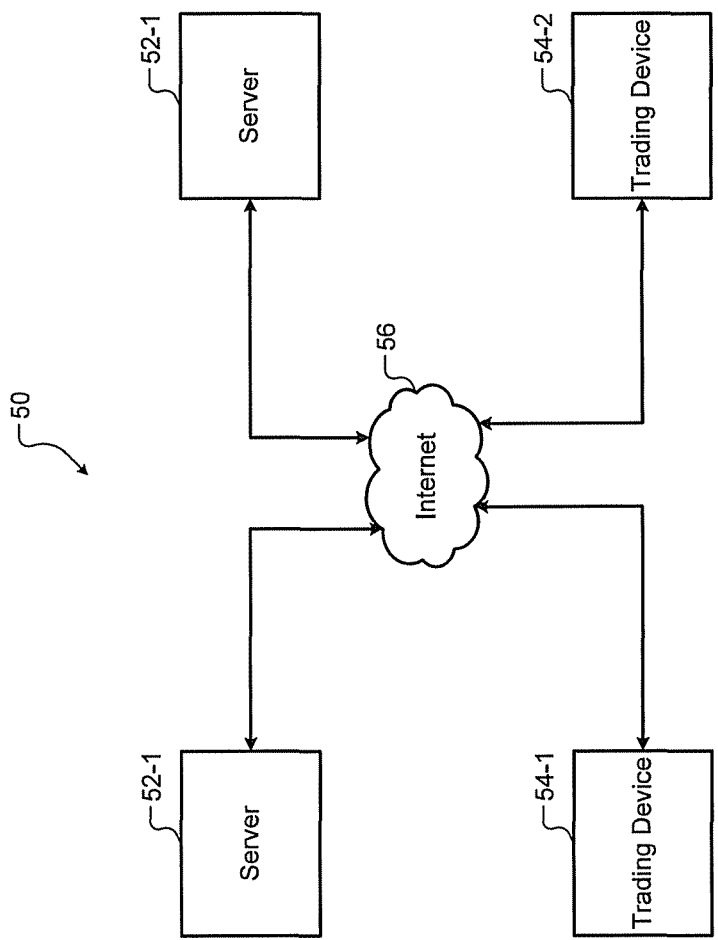
FIG. 3 is a functional block diagram of a system for energy market hedging in accordance with the present teachings.

Referring now to FIG. 3, a system 50 for trading fuels according to the present disclosure is shown. The present disclosure uses crude oils only as an example of a fuel or an energy resource. The teachings of the present disclosure may be applicable to other types of fuels or energy resources including but not limited to natural gas, coal, and so on, as well as refined products derived from crude oil. In general, the teachings of the present disclosure may be applicable to any commodity that is produced and shipped globally and that has varying properties.

The system 50 comprises a plurality of servers 52-1, 52-2, . . . , and 52-N, where N is an integer greater than or equal to 1 (collectively servers 52); a plurality of trading devices 54-1, 54-2, . . . , and 54-N; and Internet 56. The servers 52 constitute an exchange for trading the fuels. The servers 52 may be located in a single location or may be distributed in multiple locations. The servers 52 may be interconnected via the Internet 56. Alternatively or additionally, the servers 52 may be interconnected via local area networks (LANs) and/or wide area networks (WANs). The servers 52 may communicate with a plurality of fuel producers', users' and speculators' facilities via the Internet 56.

The trading devices 54 may be located all around the world and are used by traders to communicate with the exchange and to trade the fuels over the exchange. The trading devices 54 may communicate with the servers 52 using digital communications via the Internet 56, a LAN, and/or a WAN.

Figure 4:
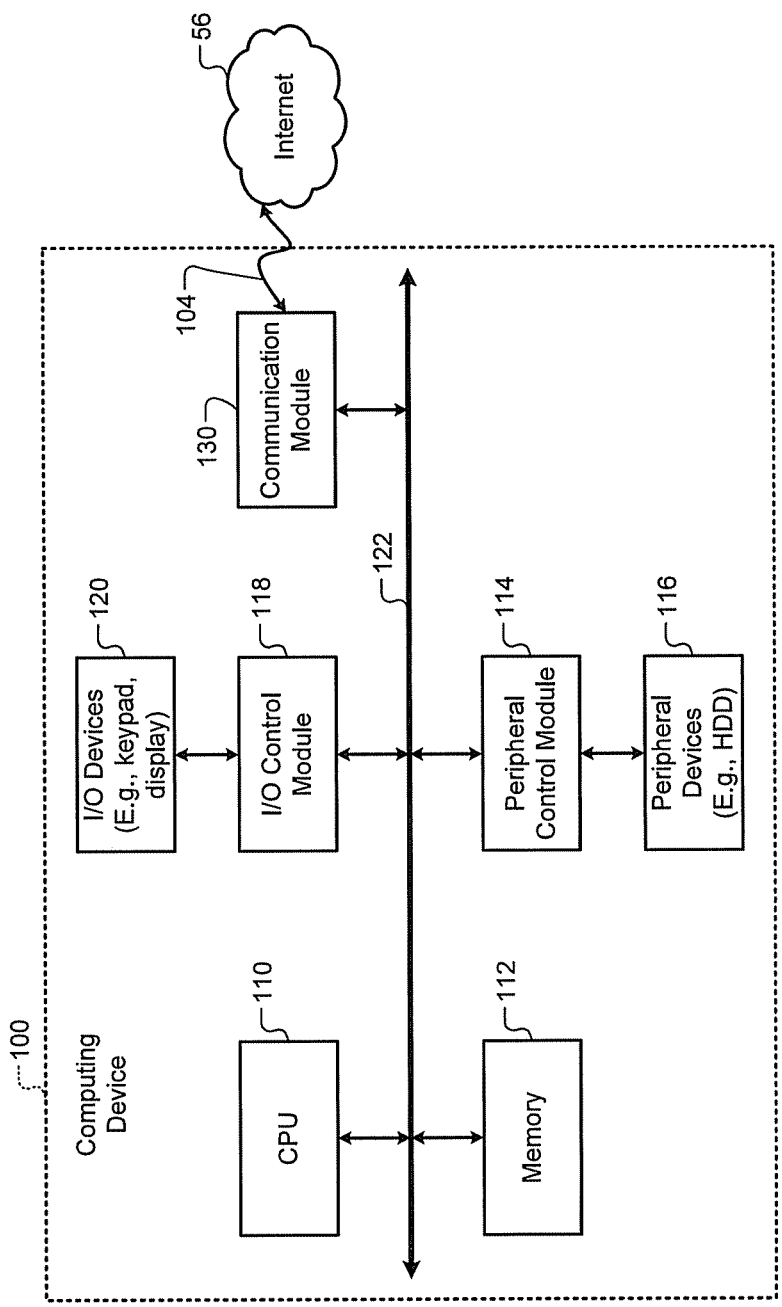
FIG. 4 is a functional block diagram of a computing device.

Referring now to FIG. 4, an example of a computing device 100 is shown. The computing device 100 may be used to implement the servers 52 and the trading devices 54. The computing device 100 may include digital device such as a personal computer (PC), a laptop computer (laptop), a mobile computing device, or a mobile internet device (MID). The mobile computing device may include a smartphone, a personal digital assistant (PDA), or a tablet. The computing device 100 may communicate with the Internet 56 via a digital communications link 104. The link 104 may be wired or wireless.

In FIG. 4, only core components relevant to understanding the present disclosure are shown. It is understood that depending on configuration, the computing device 100 may include additional components not shown. For example only, the computing device 100 may comprise digital subsystems such as a central processing unit (CPU) 110, memory 112, a peripheral control module 114, peripheral devices 116, an input/output (I/O) control module 118, I/O devices 120, and a communication module 130. The CPU 110, memory 112, and other modules of the computing device 100 communicate via a bus 122.

The CPU 110 runs an operating system (OS) and application programs. The CPU 110 digitally processes data that is transmitted and received by the computing device 100 via the Internet 56. Memory 112 digitally stores data processed by the CPU 110 and by the other modules of the computing device 100.

The peripheral control module 114 controls the peripheral devices 116 of the computing device 100. The peripheral devices 116 may include one or more digital devices such as hard disk drives (HDDs), compact disc (CD) drives, and/or digital versatile disc (DVD) drives. The peripheral devices 116 store the OS and the application programs executed by the CPU 110.

The I/O control module 118 controls the digital I/O devices 120 of the computing device. The I/O devices 120 may include a keypad, a display, and/or a pointing device. The pointing device may include a mouse and/or a touchpad. Additionally or alternatively, the computing device 100 may include a voice recognition system. The user may interact with the computing device 100 using the voice recognition system. For example, the user may input voice commands via the voice recognition system.

The communication module 130 can digitally communicate with the Internet 56. The communication module 130 can transmit data to Internet 56 and receive data from the Internet 56.

Figure 5:
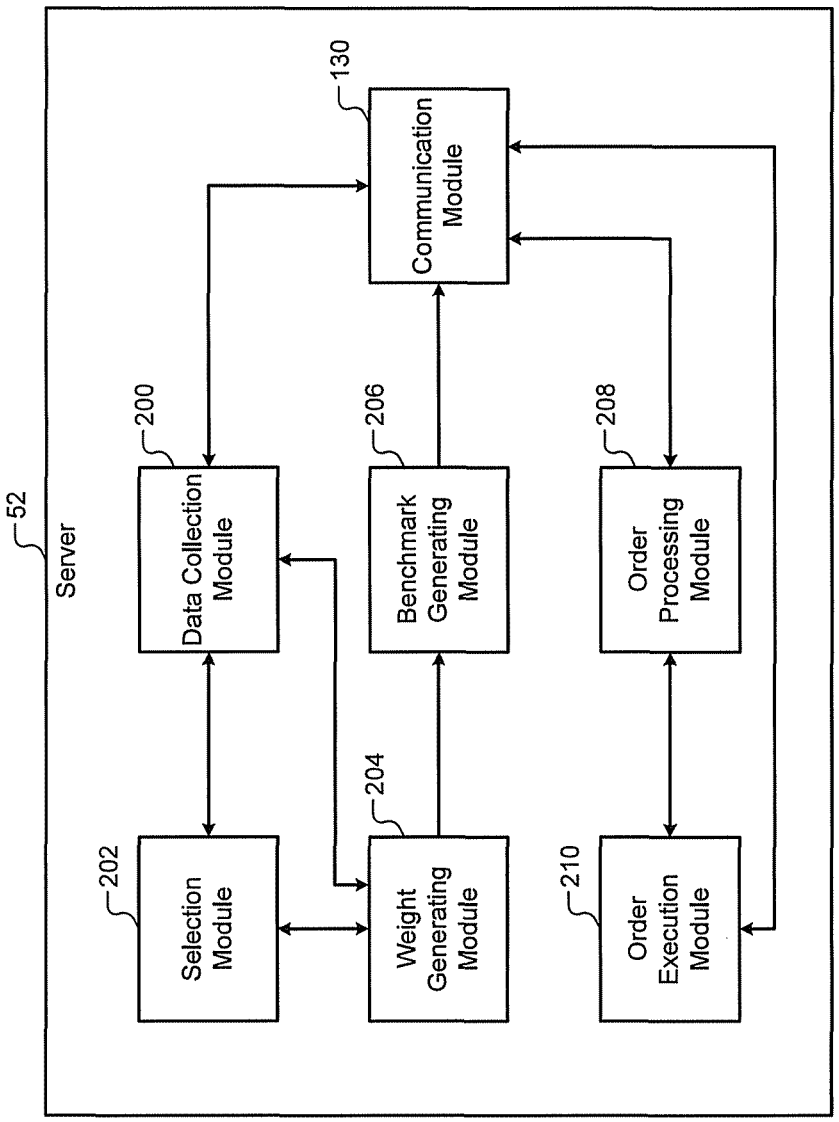
FIG. 5 is a functional block diagram of a server for the system of FIG. 3.

Referring now to FIG. 5, the computing device 100 may include the following additional modules when the computing device implements one of the servers 52. For example, the computing device 100 implementing the servers 52 may include a data collection module 200, a selection module 202, a weight generating module 204, a benchmark generating module 206, an order processing module 208, and an order execution module 210. The modules may be implemented by a combination of the hardware and software executed by the CPU 110 of the computing device 100.

The data collection module 200 collects digital data representative of a plurality of fuels. The communication module 130 may communicate with a plurality of authorized fuel production data facilities via the Internet 56 and provide the data in digital form to the data collection module 200. The data may include geographic locations where the fuels are discovered, a rate of extraction of the fuels, and properties of the fuels. The fuels may include crude oils having varying properties. The properties may include digital specific API gravity and sulfur content of the fuels.

The selection module 202 selects fuels from the plurality of fuels based on the properties of the fuels to generate sets of fuels. In other words, the selection module 202 groups fuels into sets based on the properties of the fuels. For example, see FIG. 2 showing crude oils grouped into three groups based on their respective API gravity and sulfur content.

The weight generating module 204 generates digital information representing weights for generating weighted averages. A weight for generating a weighted average for a fuel in a set is based on a rate of extraction of the fuel relative to an aggregate rate of extraction of the fuels in the set. For example, in FIG. 2, Qatar Dukhan crude oil is extracted at a rate of 300,000 BPD, which is nearly 10% of the aggregate rate of production of nearly 3 million BPD for a set of crude oils grouped as MEWA Extra Light Crude Oil. Qatar Dukhan crude oil has an API gravity of 41.1° and sulfur content of 1.22%. Applying the weight of 300,000 divided by 3 million (i.e., 10%) to the API gravity and the sulfur content of Qatar Dukhan crude oil, the weighted API gravity and sulfur content of Qatar Dukhan crude oil becomes nearly 4.00 and 0.12%, respectively.

The benchmark generating module 206 generates digital information representing benchmarks indicating aggregate compositional qualities of the sets of fuels. A benchmark (also called a fuel commodity benchmark) for a set of fuels is generated based on weighted averages of the properties of the fuels in the set of fuels. For example, in FIG. 2, the benchmarks for the MEWA Extra Light Crude Oil are a sum of the weighted averages of the properties of the constituent crude oils. That results in a benchmark having API gravity of 39.66° and sulfur content of 0.99%.

The communication module 130 communicates the benchmarks, for example via digital communications signals, to traders and receives orders for derivatives contracts for the fuels from the traders to buy or sell derivatives contracts based on the benchmarks. The orders for derivatives contracts include futures and options, as well as forwards, swaps and spreads traded directly between the traders and fuel producers via the Exchange comprising the servers 52 and without using intermediaries in the chain of Exchange communications. The orders may also include tanker derivatives contracts related to transporting and warehousing the fuels described above.

The order processing module 208 processes an order for a fuel based on differences between actual properties of the fuel to be delivered under the terms of EFP Futures and the aggregate qualities indicated by the operative benchmark for a set of fuels comprising the ordered fuel. See the trading example described above in detail. The order execution module 210 executes the trade and provides order execution data, for example in digital form, to the trader via the communication module 130. Executing an order encompasses orders being authenticated, posted, matched, executed and confirmed, cleared, settled and reported.

The data collection module 200 periodically updates the data such as BPD for the fuels. The benchmark generating module 206 generates digital information representing the updated benchmarks based on the updated data. The communication module 130 communicates the updated benchmarks, for example as digital information, to the traders.

Figure 6:
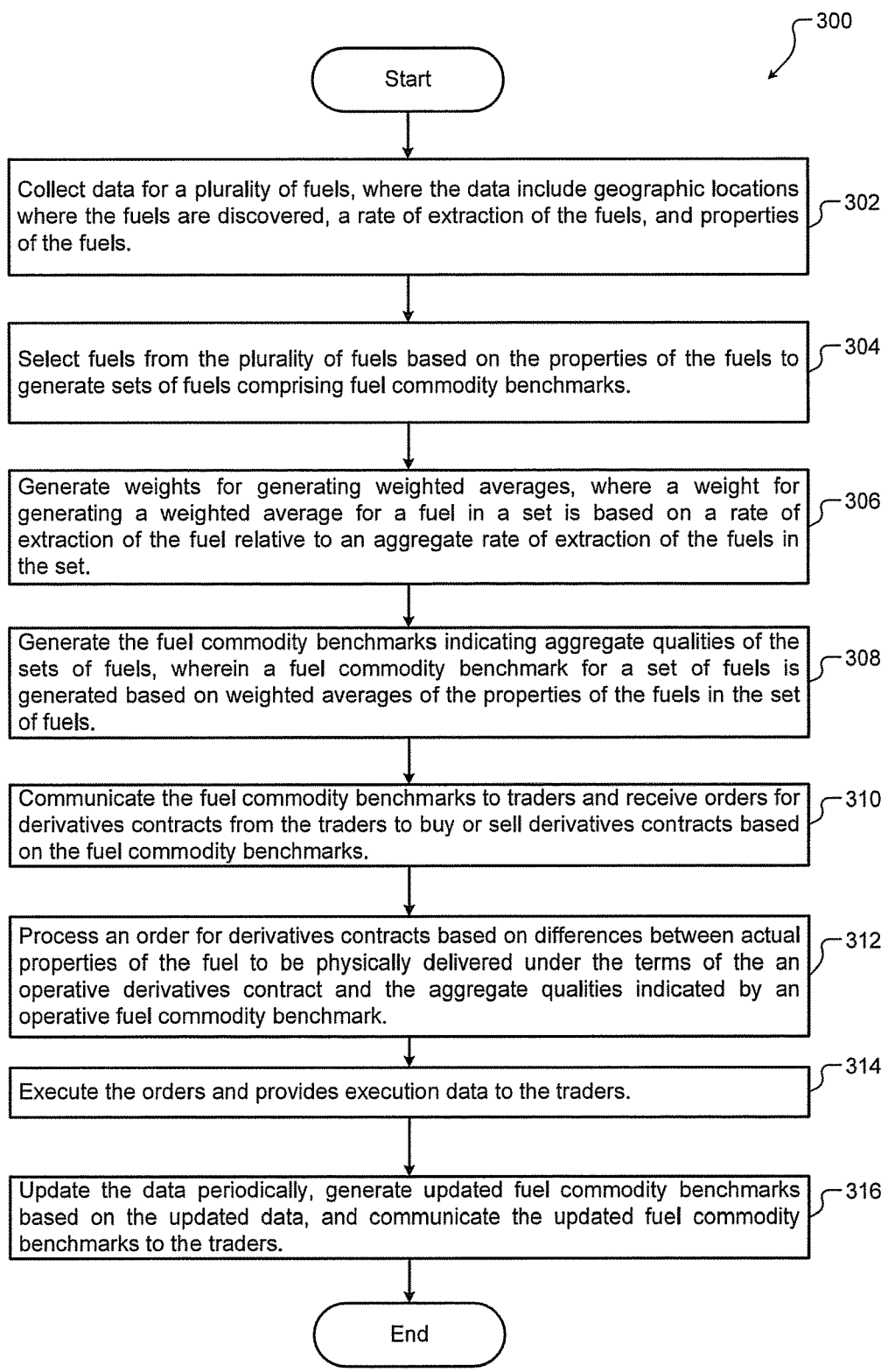
FIG. 6 is a flowchart of a method for energy market hedging in accordance with the present teachings.

Referring now to FIG. 6, a flowchart of a method 300 for trading fuels according to the present disclosure is shown. At 302, control collects data, for example digital data, for a plurality of fuels, where the data include geographic locations where the fuels are discovered, a rate of extraction of the fuels, and properties of the fuels. At 304, control selects fuels from the plurality of fuels based on the properties of the fuels to generate sets of fuels. At 306, control generates weights, for example in digital form, for generating weighted averages, where a weight for generating a weighted average for a fuel in a set is based on a digital value representing a rate of extraction of the fuel relative to an aggregate rate of extraction of the fuels in the set. At 308, control generates digital information representing benchmarks indicating aggregate compositional qualities of the sets of fuels, where a benchmark for a set of fuels is generated based on weighted averages of the properties of the fuels in the set of fuels.

At 310, control communicates the benchmarks to traders, for example in digital form, and receives orders for derivatives contracts for the fuels from the traders, for example also in digital form, to buy or sell derivatives contracts based on the benchmarks. At 312 control processes an order for a fuel based on differences between actual properties of the fuel to be delivered and the aggregate qualities indicated by a benchmark for a set of fuels comprising the ordered fuel. At 312, control executes the orders, taking into account the complementary Crude OH API Gravity Value and Crude Oil Sulfur Content Value indexes, which are intended to be used in conjunction with EFP (not cash settled) futures contracts, and provides execution data, for example in digital form, to the traders.

At 314, control updates the data periodically, generates digital information representing updated benchmarks based on the updated data, and communicates the updated benchmarks, for example in digital form, to the traders. In this manner, control executes orders that include futures and options, as well as forwards, swaps and spreads, including tanker contracts, all for example in digital form, related to transporting and warehousing the fuels, which are traded directly between the traders and fuel producers over the Exchange and without using intermediaries in the chain of Exchange communications. In some implementations, the method 300 is implemented by one or more processors that execute software designed to perform the method 300.

In general, an energy market hedging system according to the present disclosure is summarized below. The energy market hedging system provides potential price protection to authorized producers and users of Middle East (ME) crude oils and refined products while also offering authorized speculators potential profit opportunities from attendant market price volatility. The system comprises globally scattered communities of interest (COI) operating over a digital, web-based Cloud network centered around a Global Energy exchange also referred to hereafter as Global Energy e-Bourse or the "Exchange", which is the entity in charge of the following functions.

For example, the functions include specifying futures, options, forwards, swaps, spreads and other derivatives associated with the buying, selling, storing, shipping and delivery of varying grades of ME crude oil and refined products typically exported to customers in countries scattered throughout the world; listing said futures, options, forwards, swaps, spreads and other derivatives that are extended to the following COI: clearing members of the Exchange that maintain capital deposits to guarantee transactions in the event of customer defaults, non-clearing members of the Exchange, commissioned merchants, introducing brokers, trading counterparties in the form of commercials and speculators (aka Exchange customers), clearinghouses and reporting services, all of which are geographically scattered throughout the world.

Further, the functions include providing a transparent, digital, all-electronic data interchange platform able to authorize, transmit, receive, match, confirm, report, clear, settle and otherwise execute buy and sell trade orders for all listed futures, options, forwards, swaps, spreads and other derivatives with the capability of originating said orders virtually anywhere in the world over a secure web-based Cloud network; establishing all Exchange policies and rules and overseeing the compliance therewith; arranging for all trades to be cleared and settled by qualified clearinghouses; obtaining all requisite licenses and other approvals granted by applicable government regulatory bodies; and implementing all operating and reporting systems and processes conducive to the overall conduct of exchange business.

The listed futures, options, forwards, swaps, spreads and other derivatives are directly or indirectly linked to crude oil benchmarks notionally differentiated by their respective weighted average API gravity and sulfur percentage (%) content, each derived from a composite selection of crude oils produced in fields located throughout the ME region of the world, with the selection and related data being subject to change by the Exchange from time to time.

The all-electronic digital data interchange platform comprises a front-end, proprietary data storage hardware devices (aka dongles), and proprietary storage networks aka the host server. The front-end is populated by COI with virtual servers acting as the flexible portion of the web-based Cloud network. The proprietary data storage hardware devices (aka dongles) are loaded with software needed to facilitate transformational digital data protection via encryption that bit-splits data from multiple slices (or shares) and add authentication and fault tolerant information as digital data moves through the web-based Cloud network, allowing COI to share the same network infrastructure without fear of other COI or the general population at large accessing data that is not intended to be openly available, thereby providing controls over who can access specific data at any given time, where data is stored and who manages various storage needs and server networks. The proprietary storage networks aka the host server are multi-faceted and scalable to sufficiently accommodate several Exchange facilities around the world dedicated solely to the Exchange and/or at qualified remote shared Cloud data resource centers independently contracted by the Exchange.

The front-end virtual servers can take the form of the following: COI users' independently employed digital devices such as personal computers, tablets, smart phones or even data interchange terminals tied to other trading systems (where permitted) subject to requirements that they must be compatible with Exchange-provided software applications and interconnected with an Exchange-supplied dongle; or proprietary data interchange terminals made to Exchange specifications and containing the requisite software applications and dongle.

The front-end virtual servers are employed to perform the following functions: For example, the functions include receiving all digital notifications from the Exchange regarding the user's authorized status as well as all software applications and updates; and confirming all relationships with entitled intermediaries, including the terms and conditions associated with commissions and fees ("C&F"), margin guarantees, etc.

The functions further include transmitting trade orders to the Exchange in the form of digital information representing bids and offers that inter alia denote the following: commodity type (including but not limited to Crude Oil; Unleaded gasoline; Gasoil/Diesel; or Residual/Heavy Fuel Oil) or index type (including but not limited to Crude Oil API Gravity Value, Crude Oil Sulfur Content Value, Gasoil Quality Value, Residual/Heavy Fuel Oil Quality Value, Gasoil Crack Spread Differential, Daily Transit Lease for Tankers (VLCC and Suezmax, respectively), or Daily Warehouse Lease Rate for Tankers (VLCC and Suezmax, respectively).

The functions further include transmitting digital information representing benchmarks in the case of crude oil derived from one of several composites of oil fields located throughout the ME, computed on a weighted average (WA) basis, which are subject to change from time to time (including but not limited to MEWA Extra Light, MEWA Light or MEWA Medium); terms and delivery point (such as FOB: Arabian/Persian Gulf or Suez; or CIF: various destinations).

The functions further include transmitting digital information representing the type of contract or agreement (including but not limited to futures, options, forwards, swaps or spreads), as well pertinent expiration and delivery date(s); type of settlement (financial [cash or equivalent] or physical delivery); and bid or offer price and volume (in terms of number of contracts, each of which is denominated in the number of applicable barrels or gallons or weight of the underlying commodity).

The functions further include transmitting digital information representing receiving notifications from the Exchange regarding all confirmed and executed trades, moneys payable or receivable in connection with open trades, settled trades and entitled intermediaries' C&F.

The dongles are made according to Exchange specifications and supplied to COI either as serialized USB thumb drives or stick devices connectable to independently employed servers, requiring a PIN to reboot each server into an Exchange Cloud-enabled operating environment; or as an integral component of the Exchange's proprietary data interchange terminal.

The host server is employed to perform the following functions: For example, the functions includes generating digital information to notify all virtual front-end servers of their authorized COI status, as well as all Exchange and clearinghouse policies, rules, and updates concerning inter alfa all Exchange-traded futures, options, forwards, swaps, spreads, benchmarks, indexes, position limits and margin requirements. The functions further include distributing all software applications and updates provided by the Exchange to authorized COI virtual servers; and receiving digital information representing all authenticated customer bids/offers, which are posted and matched with the posted offers/bids of other customers, resulting in confirmations of all executed trades, the data of which is then transmitted to affected trade parties and entitled intermediaries, as well as to the exchange's contracted clearinghouse(s) and reporting service firm(s).

The functions further include facilitating via digital information generated by the Exchange's contracted clearinghouse(s), the posting and maintenance of all required margins levels based on the attendant open trade positions; and facilitating via the Exchange's contracted reporting service(s) the generation of digital data representing the fulsome and accurate reporting of all trade activity conducted at the Exchange such as posted prices and volumes associated with open bids and offers, as well as executed open trades, open interest, settled trades and all other historical data.

The functions further include, based on confirmations received from applicable COI and underlying executed trade data, computing digital information relating to all C&F and other charges associated with each open and settled trade, and notify all affected parties of their respective amounts payable or receivable in connection therewith; and providing a platform for account and payment managements, alerts and entitlements in connection with the payable or receivable amounts noted directly above.

The trade margining, marks-to-market, clearing and settlement functions are facilitated by qualified clearinghouses consisting either of an affiliate of the Exchange or independently contracted clearinghouse(s), each being COI in the web-based Cloud network.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable digital hardware components that provide the described functionality; or a combination of some or all of the above, such as in a system-on-chip. The term module may include a digital memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

In some implementations, the systems and methods disclosed herein can be implemented on any computing devices such networked together, where the computing devices include digital devices such as servers, desktop computers, and handheld digital computing devices such as tablets and smartphones. In these implementations, the modules described herein can be implemented on these devices using a combination of software and hardware that provide the desired functionalities. Due to connectivity and interactions between the modules and the computing devices, integrating the modules with the computing devices creates specialized digital computing devices that are specifically suitable for the systems and methods disclosed herein.

While specific examples have been described in the specification and illustrated in the drawings, it will be understood by those skilled in the art that various changes may be made and equivalence may be substituted for elements thereof without departing from the scope of the present teachings as defined in the claims. Furthermore, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings.

What is claimed is:

1. A system forming a computerized, Exchange-controlled network ("ECN") operated by an organization forming an Exchange, the system comprising:
   at least one host server disposed at a first location and being in communication with at least two front-end virtual servers disposed at second and third locations, respectively, the at least two front-end virtual servers assigned to Exchange-authorized communities of interest ("COI") each made up of at least one member and authenticated to cryptographically validate, process, transmit and receive pre-approved digital information passed along the ECN without the use of intermediaries in a chain of communications; and
   a plurality of dongles comprised of hardware and software, each said dongle configured to operate in conjunction with a respective server, enabling the dongles to control access to the ECN and what digital data is made available to its respective said server at any given time, where said digital data is stored and who manages various storage needs and server networks, regardless if the various storage needs are at a front-end or at a host end of the ECN; and enables buy and sell orders of digital ETD contracts to be cryptographically authenticated, posted and ultimately matched, executed and confirmed as trades to be cleared, settled and reported contemporaneously over the ECN in compliance with policies and rules established by the Exchange, and without the use of intermediaries in the chain of communications.

2. The system of claim 1, wherein the Exchange-authorized COI may include at least one of:
   commercial and speculator customers;
   introducing brokers;
   non-clearing commercial merchants;
   clearing members of the Exchange;
   non-clearing members of the Exchange;
   one or more clearinghouses either affiliated with the Exchange or independently contracted; and
   one or more reporting service firms.

3. The system of claim 1, wherein the host server is configured to:
   notify, using digital communications, all virtual front-end servers of their authorized COI status, as well as all Exchange and clearinghouse policies, rules, and updates concerning at least one of:

Exchange-traded futures;
options;
forwards;
swaps;
spreads;
benchmarks;
indexes;
position limits; and
margin requirements.

4. The system of claim 3, wherein the host server is further configured to:
  distribute, using digital communications, all software applications and updates provided by the Exchange to authorized COI virtualized servers; and
  receive digital information relating to all authenticated customer bids and offers, which are posted and matched with offsetting offers and bids posted by other customers, resulting in new digital information pertaining to confirmations of all executed contracts, and wherein data associated with the executed contracts is transmitted to applicable trade counterparties and entitled intermediaries, as well as to the Exchange's contracted clearinghouse(s) and reporting service firm(s).

5. The system of claim 4, wherein the host server is further configured to:
  facilitate via the Exchange's contracted clearinghouse(s) the posting and maintenance of digital information relating to all required margin levels based on attendant open trade positions;
  facilitate via the Exchange's contracted reporting service firm(s) the reporting of digital information representing all trade activity conducted at the Exchange including posted prices and volumes associated with open bids and offers, executed trades, open interest, settled trades and historical trade data;
  based on additional digital information relating to confirmations received from applicable COI and underlying executed trade data, compute all commissions and fees ("C&F") and related charges associated with each open and settled trade, and generate still further additional digital information to notify all affected parties of their respective amounts payable or receivable in connection therewith; and
  provide a platform for digital information relating to account and payment management, alerts, and entitlements in connection with the respective amounts.

6. The system of claim 1, wherein the front-end virtual servers are configured to receive digital communications representing all notifications from the Exchange regarding the user's authorized status, as well as all software applications and updates provided by the Exchange.

7. The system of claim 6, wherein the front-end virtual servers are further configured to:
  confirm all relationships with entitled intermediaries, including the terms and conditions associated with C&F, margin guarantees and other charges; and
  receive digital information pertaining to notifications from the Exchange regarding all moneys payable or receivable in connection with open trades, settled trades, and entitled intermediaries' C&F.

8. The system of claim 7, wherein the front-end virtual servers are further configured to:
  transmit information in digital form representing trade orders to the Exchange in the form of bids and offers, which denote the following ETD contract specifications: tradable asset type, benchmark applied, terms and delivery point, type of contract (i.e., futures, option, forward, swap or spread), contract expiration and delivery date(s), settlement type (i.e., financial or by physical delivery); and the bid or offer price and volume in terms of number of contracts.

9. The system of claim 8, wherein the front-end virtual servers are further configured to:
  receive confirmations in digital form of authorized executed trades from the Exchange; and
  receive digital communications relating to notification of all Exchange and clearinghouse policies and rules, updates concerning Exchange-specified futures, options, forwards, swaps spreads, benchmarks, indexes, position limits and margin requirements.

10. The system of claim 1, wherein the dongles facilitate transformational data protection via encryption that adds authentication and fault tolerant information as digital data moves through the ECN, allowing similarly uniquely-authorized COI to share a common infrastructure and related ledgers sufficient to record, store and maintain digital asset data of a financial, administrative, legal, physical and electronic nature without fear of other COI or a general population at large accessing digital data that is not intended to be openly available.

* * * * *